United States Patent
Willie et al.

(10) Patent No.: US 9,803,546 B2
(45) Date of Patent: Oct. 31, 2017

(54) DUAL INLETS FOR A TURBOFAN PRECOOLER

(71) Applicant: The Boeing Company, Chicago, IL (US)

(72) Inventors: Robert Henry Willie, Bothell, WA (US); Paul R. Tretow, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 267 days.

(21) Appl. No.: 14/068,447

(22) Filed: Oct. 31, 2013

(65) Prior Publication Data

US 2015/0114481 A1    Apr. 30, 2015

(51) Int. Cl.
| | |
|---|---|
| *B64D 13/02* | (2006.01) |
| *F02C 7/04* | (2006.01) |
| *F02C 7/141* | (2006.01) |
| *F04D 29/58* | (2006.01) |
| *F02C 7/18* | (2006.01) |
| *F02C 6/08* | (2006.01) |

(Continued)

(52) U.S. Cl.
CPC ............... *F02C 7/04* (2013.01); *B64D 13/02* (2013.01); *B64D 13/06* (2013.01); *F02C 6/04* (2013.01); *F02C 6/08* (2013.01); *F02C 7/141* (2013.01); *F02C 7/18* (2013.01); *F02C 7/185* (2013.01); *F04D 29/584* (2013.01); *B64D 2033/024* (2013.01); *B64D 2241/00* (2013.01); *F05D 2250/51* (2013.01); *Y02T 50/675* (2013.01); *Y10T 137/0536* (2015.04)

(58) Field of Classification Search
CPC .... F02C 6/04; F02C 7/04; F02C 7/141; F02C 7/18; F02C 7/185; F02C 6/08; F02K 3/115; B64D 13/02; B64D 13/06; B64D 2033/024; B64D 2033/0286; B64D 2241/00; Y10T 137/0536; F04D 25/12; F04D 29/584; F05D 2250/51
See application file for complete search history.

(56) References Cited

U.S. PATENT DOCUMENTS

| | | | |
|---|---|---|---|
| 3,765,623 | A | 10/1973 | Donelson |
| 4,174,083 | A | 11/1979 | Mohn |

(Continued)

FOREIGN PATENT DOCUMENTS

| | | |
|---|---|---|
| EP | 0469825 A2 | 2/1992 |
| EP | 0469827 A1 | 2/1992 |

(Continued)

OTHER PUBLICATIONS

Tretow et al., "Inlet System for a Precooler," U.S. Appl. No. 14/068,403, filed Oct. 31, 2013, 54 pages.

(Continued)

*Primary Examiner* — Pascal M Bui Pho
*Assistant Examiner* — Thuyhang Nguyen
(74) *Attorney, Agent, or Firm* — Yee & Associates, P.C.

(57) ABSTRACT

A method and apparatus for supplying air to a precooler. Air flow is created through a fan duct in an engine system. A first portion of the air flow is directed into a first inlet of an inlet system to feed a first half of the precooler. A second portion of the air flow is directed through the fan duct into a second inlet of the inlet system to feed a second half of the precooler.

20 Claims, 15 Drawing Sheets

(51) Int. Cl.
B64D 13/06 (2006.01)
F02C 6/04 (2006.01)
B64D 33/02 (2006.01)

(56) References Cited

U.S. PATENT DOCUMENTS

| | | | |
|---|---|---|---|
| 5,123,242 A | 6/1992 | Miller | |
| 5,203,163 A * | 4/1993 | Parsons | F02C 6/08 60/226.1 |
| 5,729,969 A | 3/1998 | Porte et al. | |
| 6,050,527 A * | 4/2000 | Hebert | B64C 23/00 137/15.1 |
| 6,058,696 A * | 5/2000 | Nikkanen | F02C 7/04 60/226.1 |
| 7,607,308 B2 | 10/2009 | Kraft et al. | |
| 7,611,093 B2 | 11/2009 | Campbell et al. | |
| 7,658,060 B2 | 2/2010 | Zysman et al. | |
| 7,717,667 B2 * | 5/2010 | Urbassik | F01D 11/14 415/1 |
| 7,810,312 B2 | 10/2010 | Stretton et al. | |
| 7,886,520 B2 | 2/2011 | Stretton et al. | |
| 8,024,935 B2 | 9/2011 | Hoover et al. | |
| 8,221,071 B2 | 7/2012 | Wojno et al. | |
| 8,721,406 B2 | 5/2014 | Kastell et al. | |
| 9,234,481 B2 | 1/2016 | Suciu et al. | |
| 2007/0264133 A1 | 11/2007 | Schwarz et al. | |
| 2008/0115504 A1* | 5/2008 | Martensson | F02C 3/13 60/785 |
| 2009/0007567 A1 | 1/2009 | Porte et al. | |
| 2009/0188234 A1 | 7/2009 | Suciu et al. | |
| 2010/0126182 A1 | 5/2010 | Hoover et al. | |
| 2013/0248141 A1 | 9/2013 | Maurer et al. | |

FOREIGN PATENT DOCUMENTS

| | | |
|---|---|---|
| EP | 2085599 A2 | 8/2009 |
| GB | 2419640 A | 5/2006 |
| JP | 2000016094 A | 1/2000 |
| JP | 2010089523 A | 4/2010 |

OTHER PUBLICATIONS

Extended European Search Report, dated Mar. 25, 2013, regarding Application No. EP14183061.2, 8 pages.
Office Action, dated Feb. 12, 2016, regarding U.S. Appl. No. 14/068,403, 45 pages.
Final Office Action, dated Aug. 4, 2016, regarding U.S. Appl. No. 14/068,403, 44 pages.
Extended European Search Report, dated Mar. 25, 2013, regarding Application No. EP14183062.0, 8 pages.
Canadian Intellectual Property Office Examination Report, dated Aug. 25, 2015, regarding Application No. 2,863,914, 2 pages.
Final Office Action, dated May 11, 2017, regarding U.S. Appl. No. 14/068,403, 33 pages.
Notice of Allowance, dated Jul. 24, 2017, regarding U.S. Appl. No. 14/068,403, 15 pages.

* cited by examiner

DUAL INLETS FOR A TURBOFAN PRECOOLER

BACKGROUND INFORMATION

1. Field

The present disclosure relates generally to inlets and, in particular, to an inlet for a precooler in an engine system of a vehicle. Still more particularly, the present disclosure relates to a method and apparatus for improving performance of the vehicle using an inlet having a swept leading edge.

2. Background

In a turbofan engine, air is drawn into a main inlet of the engine by a fan. The fan pressurizes the flow of air and the air flows from the fan in two portions. A first portion of the air flows through the core of the engine. A second portion of the air flows through a fan duct that surrounds the core of the engine.

In certain situations, air may be "bled" from the core of an engine of an aircraft to supply an environmental control system (ECS), an anti-icing system, some other type of system of the aircraft, or a combination thereof. The air bled from the core of the engine may be referred to as "bleed air."

The environmental control system of an aircraft may supply air to various areas and systems within the aircraft such as, for example, the cabin of an aircraft. In some cases, the bleed air may be too hot for use in the cabin, in other lower temperature areas of the aircraft, or in other types of areas. Consequently, the bleed air may first need to be cooled before being sent to the environmental control system. A precooler may be used to cool the bleed air. A precooler is a device or system that uses, for example, a heat exchanger to cool the bleed air prior to the bleed air being sent to the environmental control system.

Currently available precoolers typically use air flowing through the fan duct around the core of the engine to cool the bleed air. For example, an inlet located inside the nacelle of the engine may be used to direct a portion of the air flowing from the fan of the engine to the precooler. A duct connects the inlet to the precooler. Air that enters the precooler is slowed down, or diffused, through the duct prior to being fed into the precooler. A heat exchanger in the precooler then uses the diffused air to cool the bleed air.

During certain flight conditions, the bleed air may not need to be cooled. For example, during a cruise phase of flight, the bleed air may not need to be cooled using air from the fan. Thus, fan air flow into the precooler may be reduced to a low-flow state or a no-flow state during these flight conditions. In a low-flow state, the flow of air into the precooler may be significantly reduced. In a no-flow state, air may be prevented from flowing into the precooler. A valve system may be used to control the flow of air into the precooler. For example, a valve located upstream of the precooler may be used to reduce air flow into the precooler to either a low-flow state or a no-flow state during a cruise phase of flight.

However, in a low-flow state or a no-flow state, the inlet may disrupt the flow of air through the fan duct of the engine more than desired. In particular, the total pressure of the air from the fan may vary radially outward from the center axis of the fan. As used herein, the total pressure of the air is the sum of the static pressure of the air and the dynamic pressure of the air.

The variance in total pressure may result in undesired spillage during the low-flow state or the no-flow state based on current configurations for inlets. For example, undesired spillage may occur when a portion of the air flowing through the fan duct enters the inlet and then flows back out into the fan duct due to the low-flow state or the no-flow state. In other words, the air flows back out through the inlet into the fan duct, which causes an undesired disruption in air flow through the fan duct. This disruption in air flow may decrease aerodynamic performance more than desired.

Due to limitations on how quickly flow can be slowed down, or diffused, the duct used to connect an inlet to a precooler may be longer than desired. In particular, a longer duct may require that the precooler be mounted further aft. However, with the increasing size of precoolers, mounting these precoolers as far aft as needed may be more difficult than desired due to space limitations and physical constraints inside the nacelle of the engine. For example, a pylon structure may be attached to the nacelle of an engine and used to attach the engine to the airframe or wing of an aircraft. The pylon structure may extend inside of the nacelle in a manner that decreases the space available for mounting precoolers. Therefore, it would be desirable to have a method and apparatus that take into account at least some of the issues discussed above, as well as other possible issues.

SUMMARY

In one illustrative embodiment, an inlet system comprises a first inlet, a second inlet, a first duct, and a second duct. The first duct is configured to fluidly connect the first inlet to a precooler located in an engine system. The second duct is configured to fluidly connect the second inlet to the precooler located in the engine system.

In another illustrative embodiment, an engine system comprises a precooler, a first inlet, a second inlet, a first duct, and a second duct. The first duct is configured to fluidly connect the first inlet to the precooler. The second duct is configured to fluidly connect the second inlet to the precooler.

In yet another illustrative embodiment, a method for supplying air to a precooler is provided. Air flow is created through a fan duct in an engine system. A first portion of the air flow is directed into a first inlet of an inlet system to feed a first half of the precooler. A second portion of the air flow is directed through the fan duct into a second inlet of the inlet system to feed a second half of the precooler.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have an inlet system that does not disrupt the flow of air through the fan duct of an engine more than desired. By reducing the disruption to the flow of air caused by the inlet system, performance of the engine may be improved. In particular, this type of inlet system may improve the performance of the engine by reducing total pressure losses, static pressure distortion, or both.

Further, the illustrative embodiments recognize and take into account that it may be desirable to have an inlet system that allows a precooler to be mounted further forward than is currently possible using current configurations for inlets. By mounting the precooler further forward, away from the location where the structural pylon extends within the nacelle of an engine, larger precoolers may be installed within engines. These larger precoolers may have an increased capacity to cool bleed air.

Thus, the illustrative embodiments provide an inlet system that comprises an inlet, a leading edge of the inlet, and a vane associated with the inlet. The leading edge of the inlet is positioned relative to a direction of air flow such that total pressure of air along the leading edge of the inlet is equalized within selected tolerances. The vane is positioned relative to the direction of the air flow such that the total pressure of the air along the vane leading edge is equalized within the selected tolerances. A flow of air into the inlet system, when the inlet system is operating in one of a no-flow state or a low-flow state, is reduced when the total pressure of the air along the leading edge of the inlet is equalized within the selected tolerances.

Figure 1:
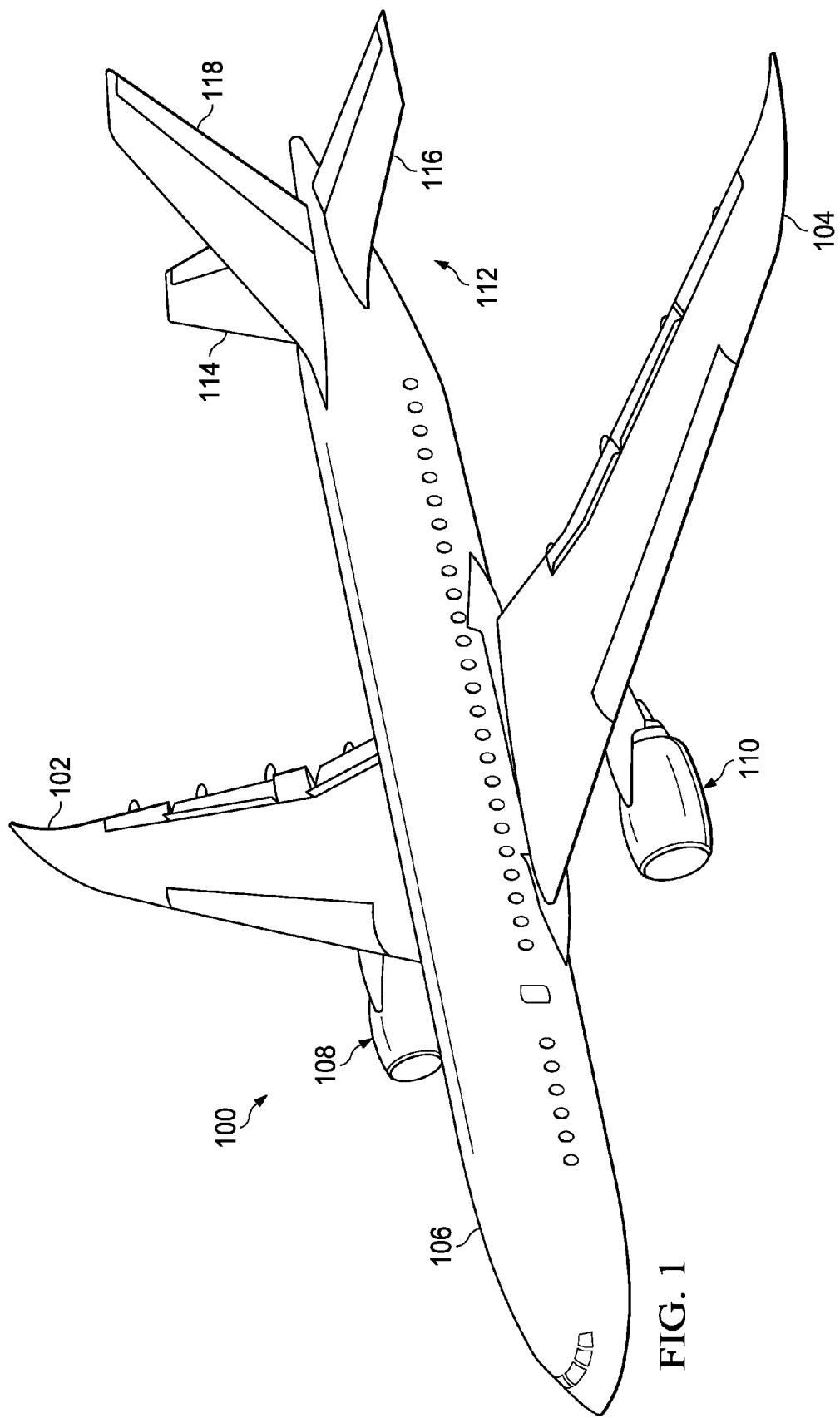
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine system 108 attached to wing 102 and engine system 110 attached to wing 104.

Body 106 has tail section 112. Horizontal stabilizer 114, horizontal stabilizer 116, and vertical stabilizer 118 are attached to tail section 112 of body 106.

Engine system 108 and engine system 110 may each have an inlet system (not shown in this view) for a precooler (not shown in this view) that is implemented in accordance with an illustrative embodiment. Engine system 110 may be described in greater detail below.

Figure 2:
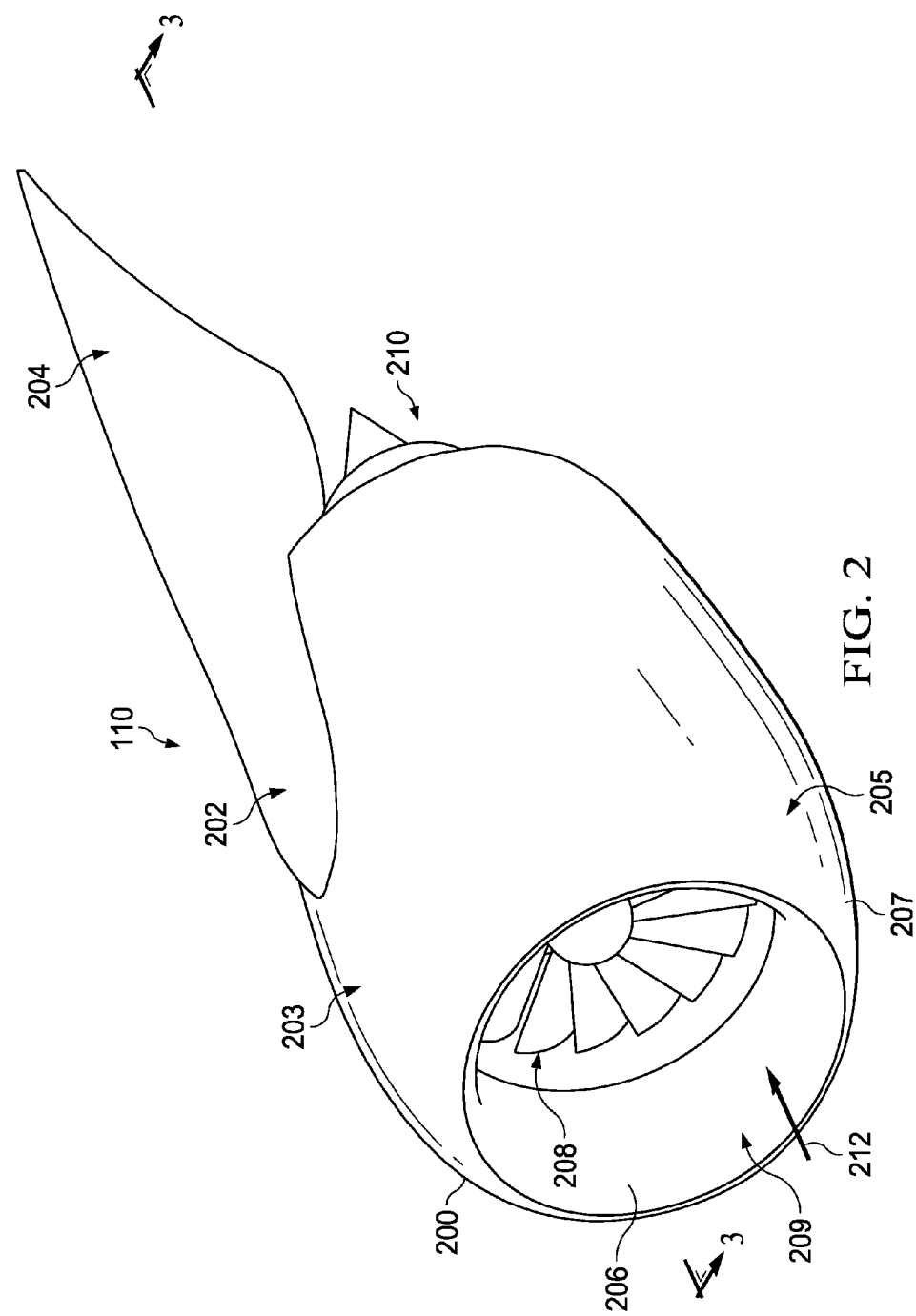
FIG. 2 is an illustration of an engine system in accordance with an illustrative embodiment.

With reference now to FIG. 2, an illustration of engine system 110 from FIG. 1 is depicted in accordance with an illustrative embodiment. In this illustrative example, engine system 110 includes nacelle 200. Nacelle 200 is housing for the various components of engine system 110.

As depicted, nacelle 200 may be comprised of first section 206 located at first side 203 of engine system 110 and second section 207 located at second side 205 of engine system 110. Nacelle 200 of engine system 110 is associated with wing 104 of aircraft 100 from FIG. 1 through structure 202.

In this illustrative example, structure 202 is located at an aft end of engine system 110 with respect to aircraft 100 in FIG. 1. Engine inlet 209 is located at the forward end of engine system 110 with respect to aircraft 100 in FIG. 1.

Structure 202 may be comprised of one or more different components for mounting engine system 110 to wing 104 of aircraft 100. In some illustrative examples, structure 202 may be referred to as pylon 204. In other illustrative examples, structure 202 may be considered as including a strut and a pylon.

Together, structure 202, nacelle 200, and the components within nacelle 200 may form engine system 110. In this illustrative example, nacelle 200 and the components within nacelle 200 may be referred to as an "engine." Of course, in other illustrative examples, nacelle 200, the components within nacelle 200, and structure 202 may all be referred to as an "engine" rather than engine system 110.

As used herein, when one component is "associated" with another component, the association is a physical association in the depicted examples. For example, a first component, such as nacelle 200, may be considered to be associated with a second component, such as wing 104 in FIG. 1, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, as an extension of the second component, or both.

As depicted, engine system 110 includes fan 208, engine inlet 209, and exhaust system 210. Fan 208 may be, for example, a turbofan. As depicted, air flows into engine inlet 209 in direction 212 towards fan 208. Fan 208 uses this air to create an air flow through engine system 110.

A portion of this air flow may be directed into the engine core of engine system 110, while another portion of this air flow may be directed through a fan duct within engine system 110. One or more aerodynamic surfaces within engine system 110 may separate the portion of the fan duct on first side 203 of engine system 110 from the fan duct on second side 205 of engine system 110.

In this illustrative example, engine system 110 includes an inlet system that is configured to direct a portion of the air flow through the fan duct to a precooler. This inlet system is depicted in FIGS. 3-7, described below.

Figure 3:
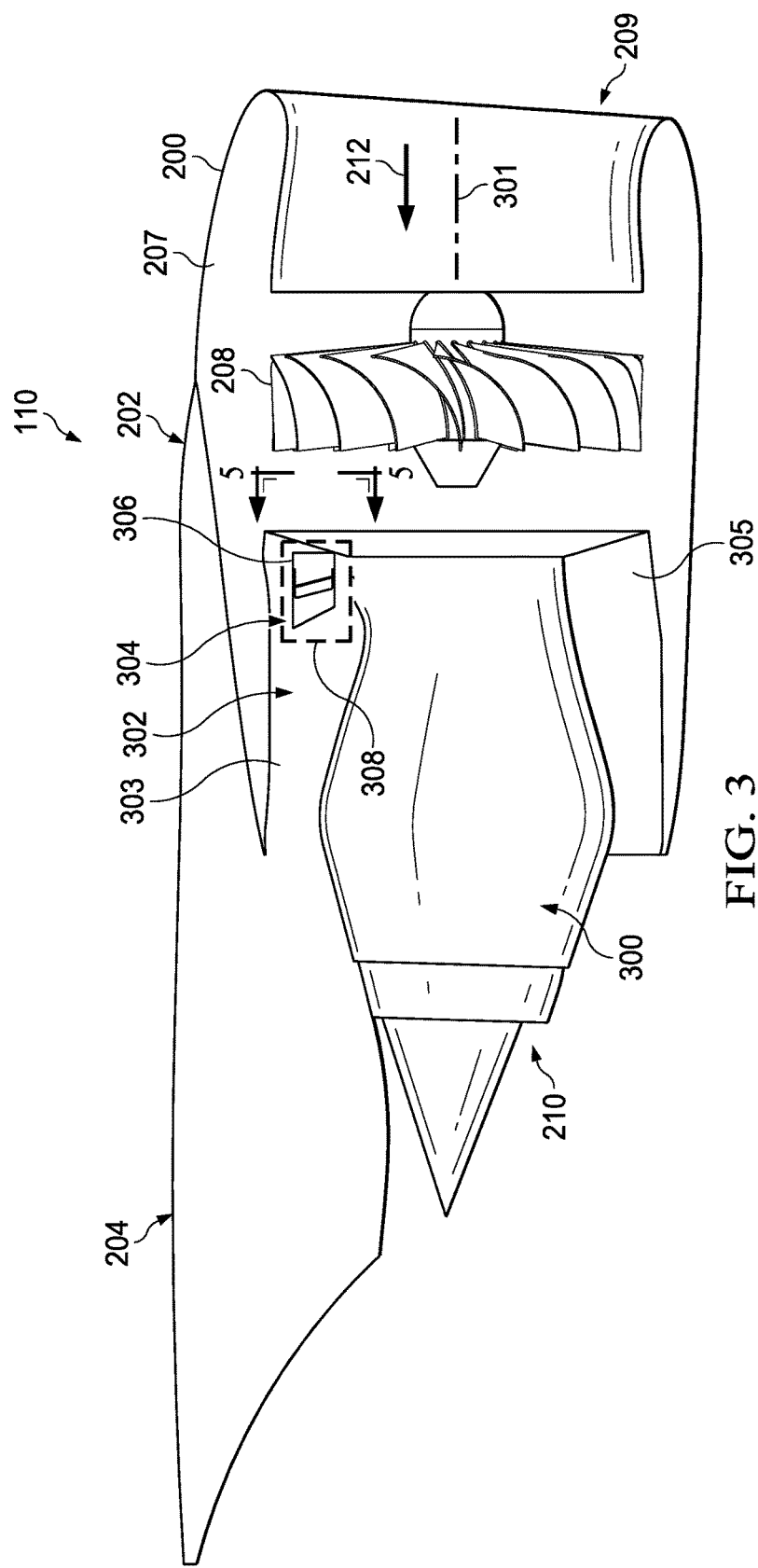
FIG. 3 is an illustration of an engine system with a first part of a nacelle hidden in accordance with an illustrative embodiment.

With reference now to FIG. 3, an illustration of engine system 110 from FIGS. 1-2, with first section 206 of nacelle 200 hidden, is depicted in accordance with an illustrative embodiment. In this illustrative example, engine system 110 is seen from the view taken with respect to lines 3-3 in FIG. 2 with first section 206 of nacelle 200 hidden such that the interior of engine system 110 may be more clearly seen in this view.

As depicted, engine system 110 includes engine core 300. Engine core 300 receives a portion of the air that flows from fan 208. Fan 208 may rotate about center axis 301 of fan 208. Rotation of fan 208 may create an air flow towards engine core 300. The air flowing from fan 208 may be referred to as "fan air." The total pressure of this fan air may vary radially with respect to center axis 301. For example, the total pressure of the fan air may increase radially outwards from center axis 301 and then decrease. Fan air flowing from fan 208 may have a maximum total pressure between center axis 301 and an outer edge of fan 208.

Fan duct 302 is formed between nacelle 200 and engine core 300. In particular, fan duct 302 is divided into two portions. As depicted, a first portion of fan duct 302 is formed around engine core 300 between first surface 303 and second surface 305. In some cases, first surface 303 and second surface 305 may be referred to as a first bifurcation surface and a second bifurcation surface, respectively. The first bifurcation surface may be an upper bifurcation surface, and the second bifurcation surface may be a lower bifurcation surface. First surface 303 and second surface 305 may be aerodynamic surfaces associated with nacelle 200.

In this illustrative example, inlet system 304 is associated with first surface 303. Inlet system 304 includes inlet 306. Inlet 306 is a "flush inlet" in this example. In the illustrative example, a "flush inlet" is an inlet that is mounted substantially flush with first surface 303. A flush inlet may also be referred to as a flush-mounted inlet in some cases. An enlarged view of portion 308 of first surface 303 is depicted in FIG. 4, described below.

Inlet system 304 is used to supply a portion of fan air to a precooler (not shown in this view). The precooler uses this portion of fan air to cool air that is bled from engine core 300. Air may be bled from engine core 300 for use in supplying air to one or more systems of aircraft 100 from FIG. 1. These systems may include, for example, without limitation, at least one of an environmental control system (ECS), an anti-icing system, or some other types of system.

For example, fan air that enters engine core 300 may be compressed by a compressor to increase air pressure within the compressor. This compressed air may be injected with and burned with fuel in a combustor. A portion of the compressed air is sent to the precooler to be cooled prior to being sent to different systems in aircraft 100 in FIG. 1. This portion of the compressed air is referred to as "bleed air."

Figure 4:
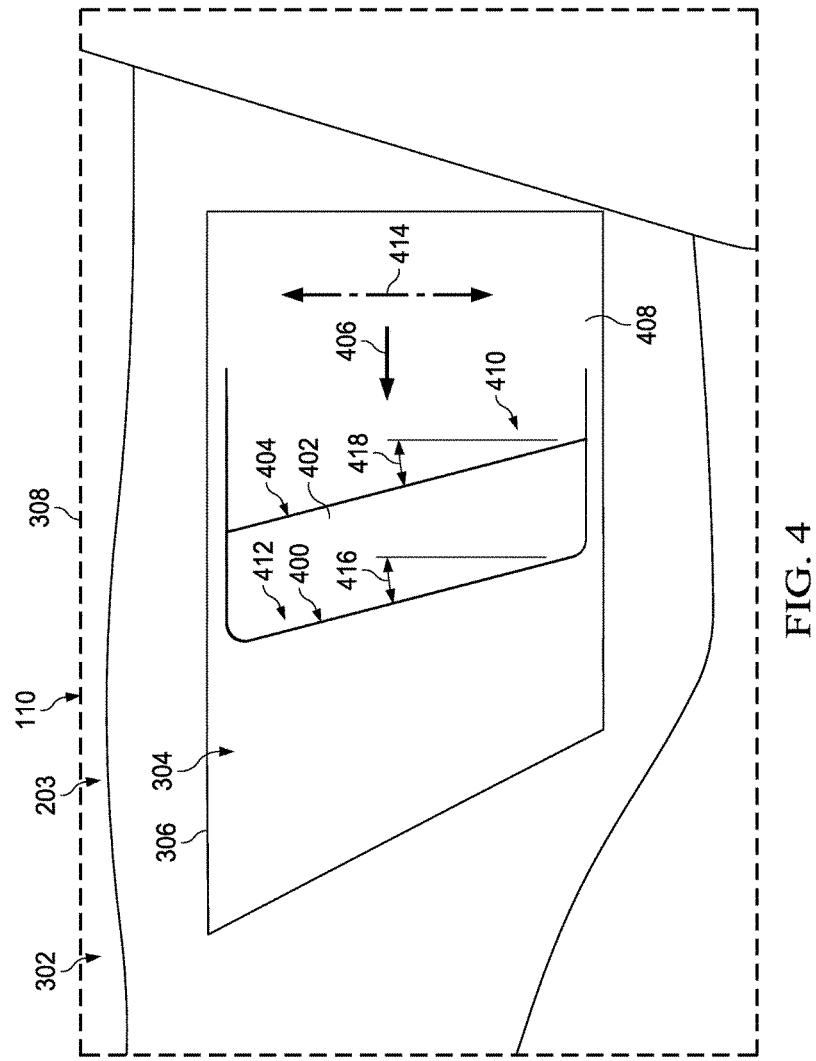
FIG. 4 is an illustration of an enlarged view of a portion of a first surface and an inlet in accordance with an illustrative embodiment.

With reference now to FIG. 4, an illustration of an enlarged view of portion 308 of first surface 303 and inlet 306 from FIG. 3 is depicted in accordance with an illustrative embodiment. As depicted, inlet 306 has leading edge 400. Leading edge 400 is the edge of inlet 306 that is most upstream with respect to air flow through inlet system 304. In some cases, leading edge 400 may be referred to as the "highlight" or "inlet highlight" of inlet 306.

Inlet 306 also includes vane 402 in this illustrative example. Vane 402 has vane leading edge 404. Vane leading edge 404 is the most upstream edge of vane 402.

The fan air may flow through inlet 306, past inlet 306, or both, in direction 406. This air may be fan air flowing from fan 208 in FIG. 2. Surface 408 of inlet 306 and vane 402 form opening 410 through which air may flow into inlet system 304. Vane 402 and leading edge 400 form opening 412 through which air may flow into inlet system 304. In this manner, the air flow into inlet system 304 may be divided by vane 402, but then recombined within a single channel within inlet system 304 downstream of vane 402.

A portion of the fan air from fan 208 that flows through fan duct 302 in FIG. 3 may be directed into inlet 306 when inlet system 304 is operating in a high-flow state. In a high-flow state, inlet system 304 allows air that enters inlet system 304 through inlet 306 to flow into a precooler (not shown in this view).

However, when inlet system 304 is operating in a low-flow state or a no-flow state, air flow through inlet system 304 may be reduced. In a low-flow state, the flow of air through inlet system 304 into the precooler is significantly reduced. In a no-flow state, the flow of air into the precooler is prevented. A valve system may be used to control switching between the high-flow state, the low-flow state, and the no-flow state. In some cases, inlet system 304 may be only able to switch between the high-flow state and one of the low-flow state and the no-flow state.

In this illustrative example, inlet system 304 may operate in a high-flow state when the fan air is needed to cool bleed air having a temperature above a selected threshold. This bleed air may be referred to as hot bleed air or high-temperature bleed air. The high-temperature bleed air may need to be cooled based on the temperature limits of the one or more aircraft systems to which the air is to be supplied, based on safety concerns, or both. However, when the bleed air does not need to be cooled by the precooler, inlet system 304 may operate in the low-flow state or the no-flow state.

When inlet system 304 operates in the low-flow state or the no-flow state, it is desirable that fan air does not flow into inlet 306 through opening 410 or opening 412. Thus, inlet 306 is configured such that the air flow through inlet 306 is reduced to within selected tolerances when inlet system 304 is operating in the low-flow state or the no-flow state. In some cases, air flow through inlet 306 may be completely prevented.

In particular, leading edge 400 of inlet 306 and vane leading edge 404 of vane 402 are positioned such that the total pressure of the fan air along leading edge 400 and vane leading edge 404 of vane 402, respectively, is equalized within selected tolerances. In other words, leading edge 400 and vane leading edge 404 are positioned to take into account that the total pressure of the fan air varies radially outward from center axis 301 in FIG. 3.

In this illustrative example, the total pressure of the fan air along a leading edge, such as leading edge 400 or vane leading edge 404, is equalized within selected tolerances when the total pressure of the fan air at one portion of the leading edge is substantially equal, within selected tolerances, to the total pressure at all other portions of the leading edge. As depicted, leading edge 400 of inlet 306 is positioned such that leading edge 400 has first angle 416 relative to first normal axis 414. First normal axis 414 is an axis that is substantially normal to direction 406 of the air flow from fan 208 in FIGS. 2-3. Similarly, vane leading edge 404 of vane 402 has second angle 418 relative to first normal axis 414.

In this illustrative example, first angle 416 may be about, for example, without limitation, 15 degrees relative to first normal axis 414. Second angle 418 may also be about, for example, without limitation, 15 degrees relative to first normal axis 414. In this manner, first angle 416 and second angle 418 may be the same. In other words, leading edge 400 of inlet 306 and vane leading edge 404 of vane 402 may be substantially parallel to each other. Of course, in other illustrative examples, first angle 416 and second angle 418 may be different.

First angle 416 and second angle 418 allow the lower portions of leading edge 400 and vane leading edge 404, respectively, to encounter the fan air before the upper portions of these leading edges. This angling of leading edge 400 and vane leading edge 404 helps substantially equalize the total pressure of the fan air along these leading edges.

Figure 5:
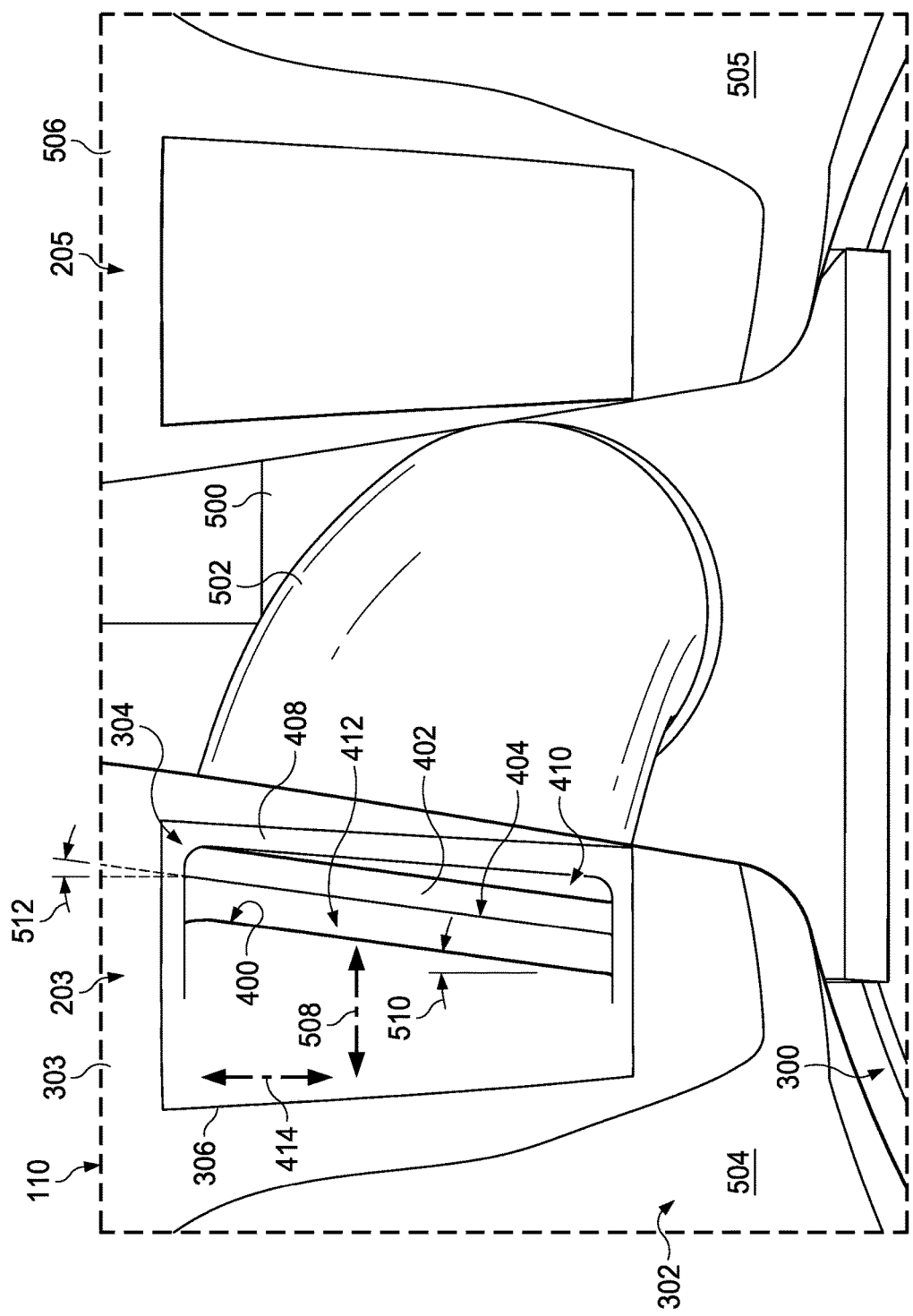
FIG. 5 is an illustration an enlarged view of an inlet system in accordance with an illustrative embodiment.

With reference now to FIG. 5, an illustration of an enlarged view of inlet system 304 in FIGS. 3-4 is depicted in accordance with an illustrative embodiment. In this illustrative example, an enlarged view of inlet system 304 is depicted taken with respect to lines 5-5 in FIG. 3.

As depicted, engine system 110 also includes precooler 500. Inlet system 304 includes duct 502. Duct 502 fluidly connects inlet 306 to precooler 500. As used herein, a component, such as a duct, "fluidly connects" a first component to a second component by allowing a fluid, such as air, to flow from the first component to the second component. For example, a duct may allow air to flow from a channel within the first component, through the duct, into a channel within the second component. In this illustrative example, duct 502 fluidly connects inlet 306 and precooler 500 by allowing air to flow from inlet 306 into precooler 500. Duct 502 allows the air flowing through inlet system 304 to be diffused in preparation for feeding the air to precooler 500.

Further, fan duct 302 comprises first section 504 and second section 505. The portion of fan air that flows through first section 504 is the portion of fan air from which air flow is directed into inlet system 304.

In this illustrative example, third surface 506 may also be seen in this view. A second portion of fan duct 302 is formed around engine core 300 between third surface 506 and a fourth surface (not shown in this view). Third surface 506 and this fourth surface may be referred to as a third bifurcation surface and a fourth bifurcation surface, respectively. Third surface 506 and the fourth surface may be aerodynamic surfaces associated with nacelle 200 in FIGS. 2-3.

In this example, engine system 110 has a single inlet, inlet 306. However, in other illustrative examples, a second inlet may be mounted substantially flush with third surface 506.

As depicted in this example, second normal axis 508 may be an axis substantially normal to both first normal axis 414 and direction 406 in FIG. 4. Leading edge 400 of inlet 306 has first angle 510 relative to second normal axis 508. Vane leading edge 404 of vane 402 has second angle 512 relative to second normal axis 508.

First angle 510 and second angle 512 also help substantially equalize the total pressure along leading edge 400 and vane leading edge 404, respectively. The angling of leading edge 400 and vane leading edge 404 relative to first normal axis 414, as seen in FIG. 4, and the angling of leading edge 400 and vane leading edge 404 relative to second normal axis 508 may be referred to as "sweeping" these leading edges.

Thus, leading edge 400 of inlet 306 and vane leading edge 404 of vane 402 may be "swept" such that total pressure of the fan air along these leading edges is equalized within selected tolerances. In some cases, leading edge 400 may be referred to as a "swept leading edge" and vane 402 may be referred to as a "swept vane." The total pressure of the fan air along these leading edges may be equalized within selected tolerances such that air flow into inlet 306 is reduced when inlet system 304 is operating in a low-flow state or a no-flow state. In other words, most, if not all, of the fan air may pass by inlet 306 without entering inlet system 304 when inlet system 304 operates in a low-flow state or a no-flow state.

Figure 6:
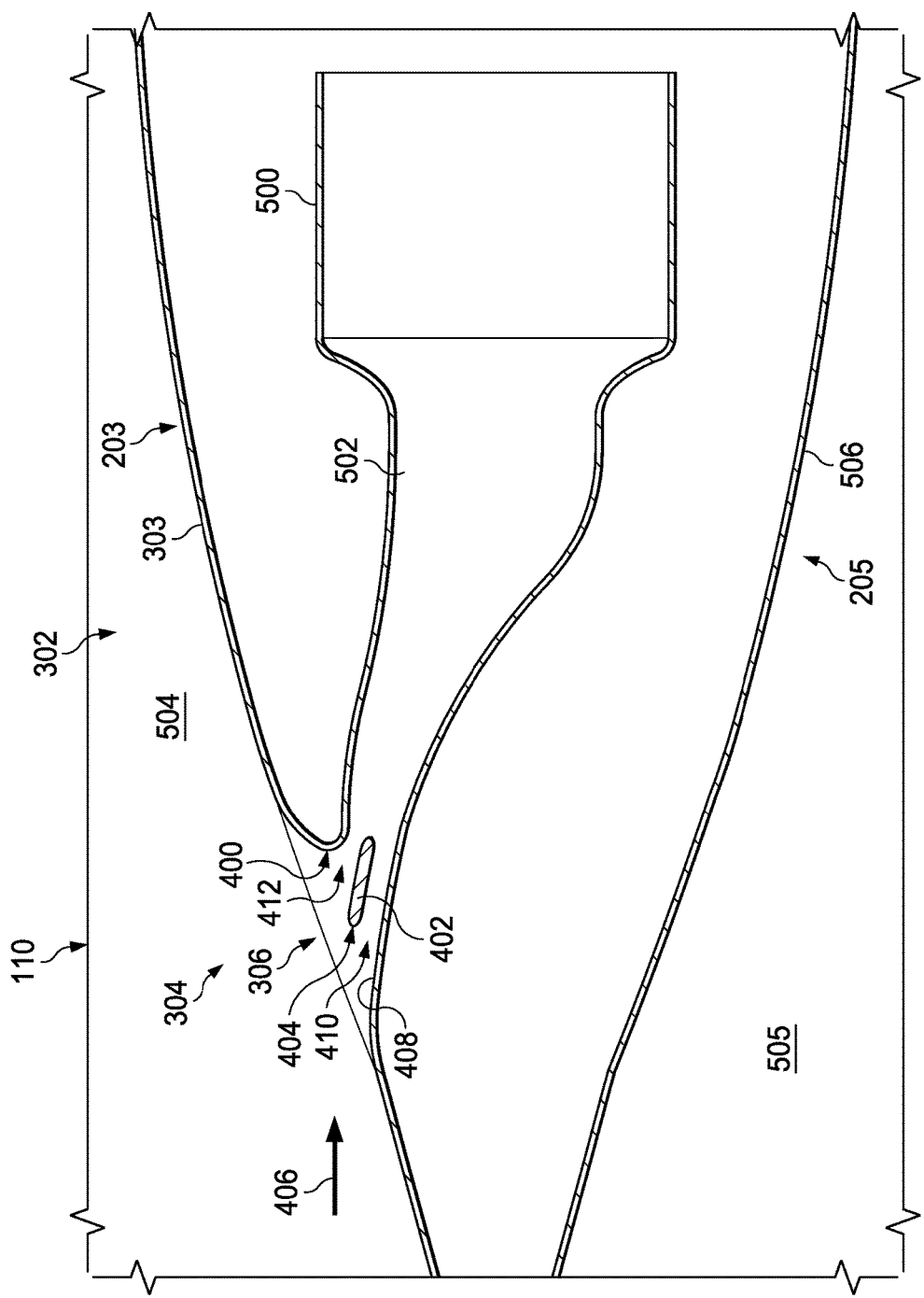
FIG. 6 is an illustration of a top view of an inlet system in accordance with an illustrative embodiment.

With reference now to FIG. 6, an illustration of a top view of inlet system 304 from FIG. 5 is depicted in accordance with an illustrative embodiment. The path of flow for the fan air through inlet 306 into duct 502 is more clearly seen.

Figure 7:
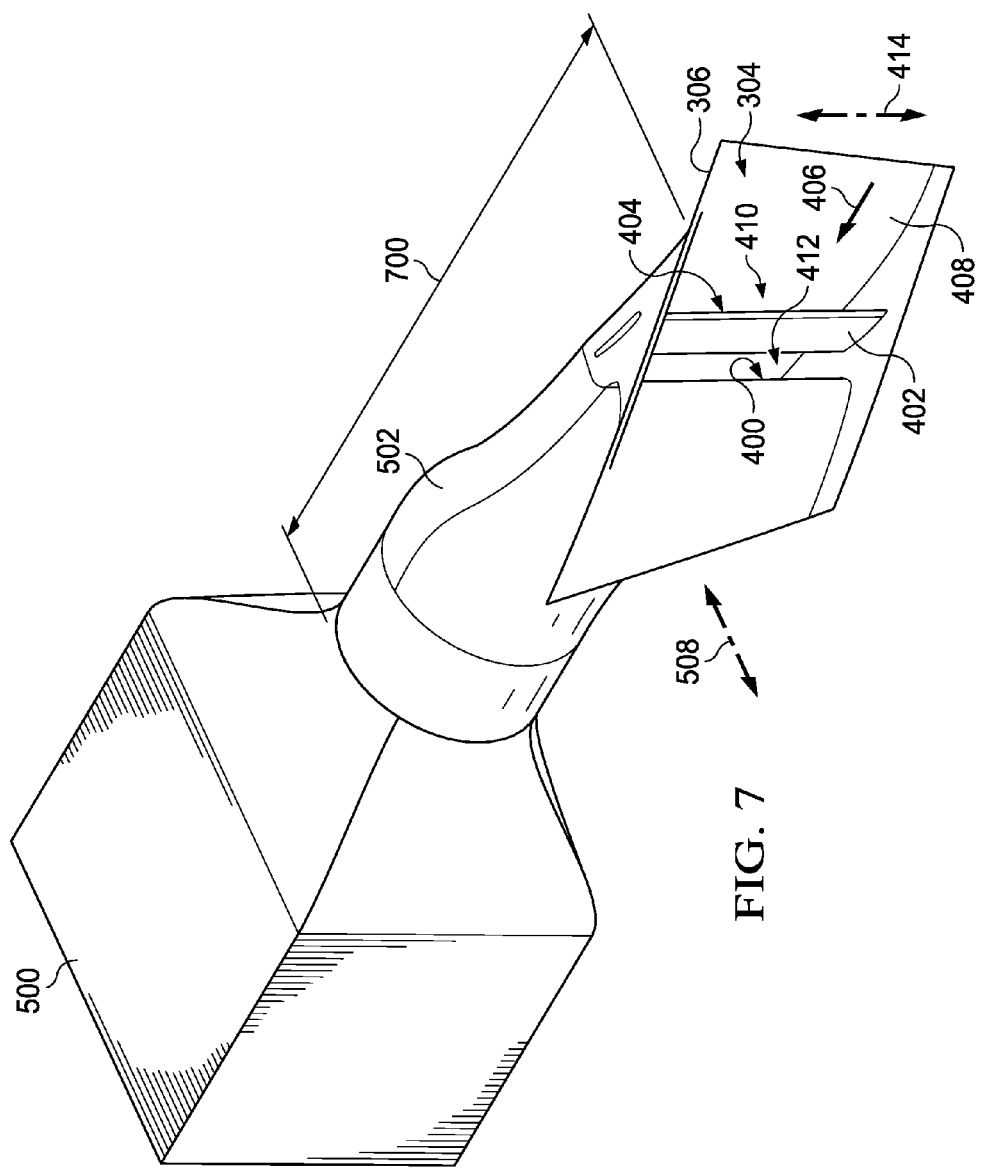
FIG. 7 is an illustration of an inlet system and a precooler in accordance with an illustrative embodiment.

With reference now to FIG. 7, an illustration of inlet system 304 and precooler 500 is depicted in accordance with an illustrative embodiment. In this illustrative example, inlet system 304 and precooler 500 are shown without the components and surfaces of engine system 110 in FIGS. 1-4. As depicted, duct 502 may have length 700.

In some cases, it may be desirable to decrease length 700 of duct 502 due to space limitations and other physical constraints within engine system 110. Decreasing length 700 of duct 502 may be achieved by using two inlets for inlet system 304 as compared to a single inlet. An example of one implementation for an inlet system having two inlets is depicted in FIG. 8 below.

Figure 8:
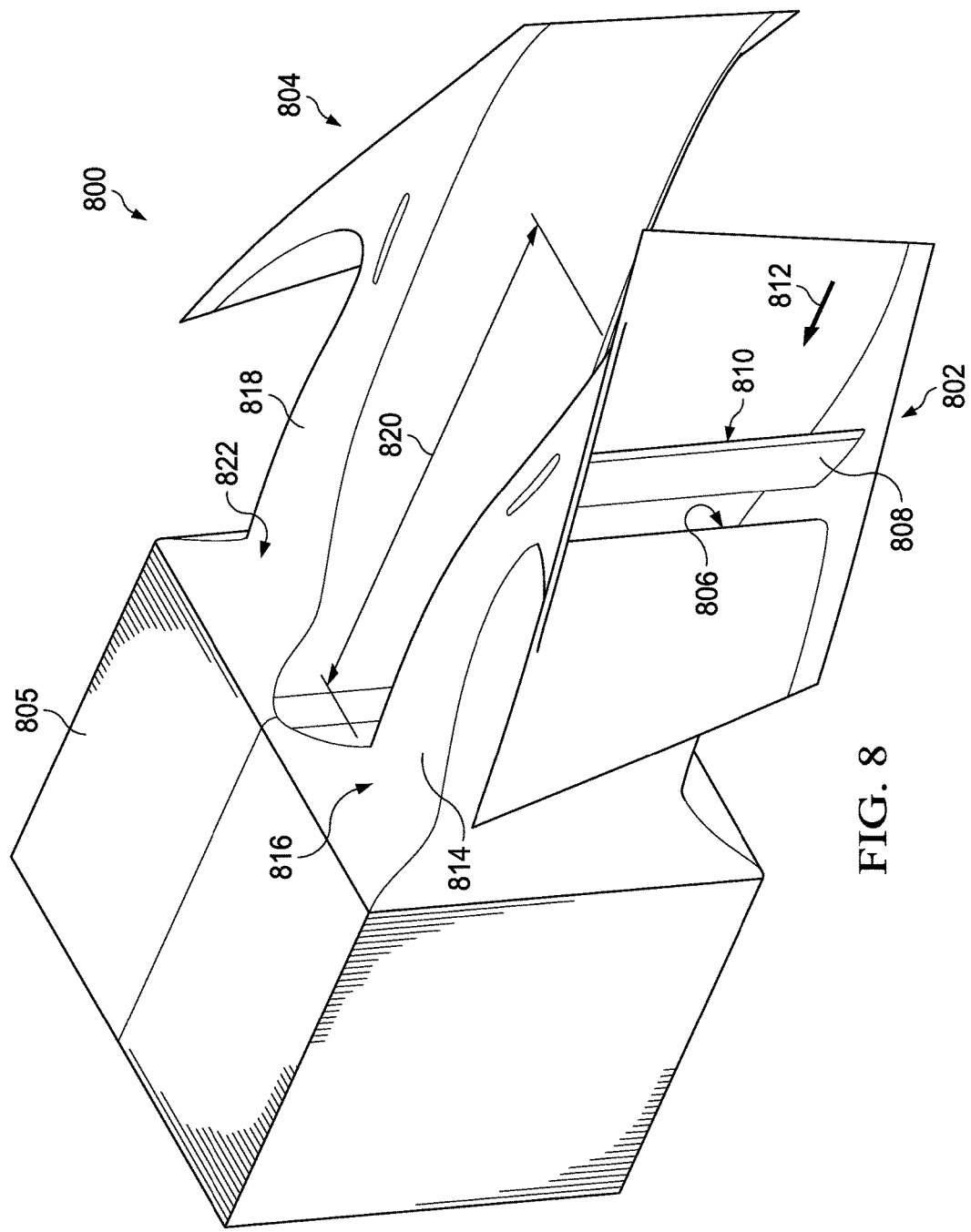
FIG. 8 is an illustration of an inlet system having two inlets and a precooler in accordance with an illustrative embodiment.

With reference now to FIG. 8, an illustration of an inlet system having two inlets and a precooler is depicted in accordance with an illustrative embodiment. In this illustrative example, inlet system 800 may include first inlet 802 and second inlet 804, both of which are fluidly connected to precooler 805.

First inlet 802 and second inlet 804 may each be implemented in a manner similar to inlet 306 in FIGS. 3-7. As depicted, first inlet 802 may include leading edge 806 and vane 808. Vane 808 may have vane leading edge 810. Second inlet 804 may also include a leading edge (not shown) and a vane (not shown).

As depicted, fan air may flow into first inlet 802 in direction 812. Leading edge 806 and vane 808 may be positioned such that the total pressure of the fan air along leading edge 806 of first inlet 802 and along vane leading edge 810 of vane 808 is equalized within selected tolerances. In particular, leading edge 806 of first inlet 802 and vane leading edge 810 of vane 808 may be swept such that the total pressure of the fan air along these leading edges is substantially equalized within selected tolerances.

Air may travel from first inlet 802 to precooler 805 through first duct 814. First duct 814 may be fluidly connected to precooler 805 at first precooler entrance 816. In this manner, first duct 814 may fluidly connect first inlet 802 to a first portion of precooler 805. Air may travel from second inlet 804 to precooler 805 through second duct 818. Second duct 818 may be fluidly connected to precooler 805 at second precooler entrance 822. In this manner, second duct 818 may fluidly connect second inlet 804 to a second portion of precooler.

First duct 814 and second duct 818 may each have a smaller cross-sectional area than duct 502 from FIGS. 5-7. Each of these ducts may feed only a portion of precooler 805. In one illustrative example, each of these ducts may feed only half of precooler 805. By reducing the cross-sectional area of first duct 814 and second duct 818, the length needed for these ducts to achieve the desired diffusion of air prior to feeding precooler 805 may be reduced.

As depicted, first duct 814 and second duct 818 both have length 820. Length 820 may be shorter than length 700 in FIG. 2. Using two inlets allows the length of the ducts connecting these inlets to a precooler to be shorter than the length of a duct connecting a single inlet to a precooler. In particular, by using two inlets with each feeding half of precooler 805, the diffusion rate is cut in half.

Using a single inlet and duct requires an increased length as compared to using two separate inlets and ducts because of the need to increase the duct area in order to slow the velocity of the flow of the air through the duct. Two ducts allow the air flow to be separated into two halves and feed only an individual half of precooler 500. As a result, these two ducts may only need to be half as long as compared to when a single duct is used.

Further, the decreased lengths of first duct 814 and second duct 818 may allow precooler 805 to be mounted further forward in engine system 110 towards engine inlet 209 in FIG. 2 as compared to precooler 500 in FIGS. 5-7. In other words, precooler 805 may be mounted closer towards engine inlet 209 than precooler 500 in FIGS. 5-7.

Figure 9:
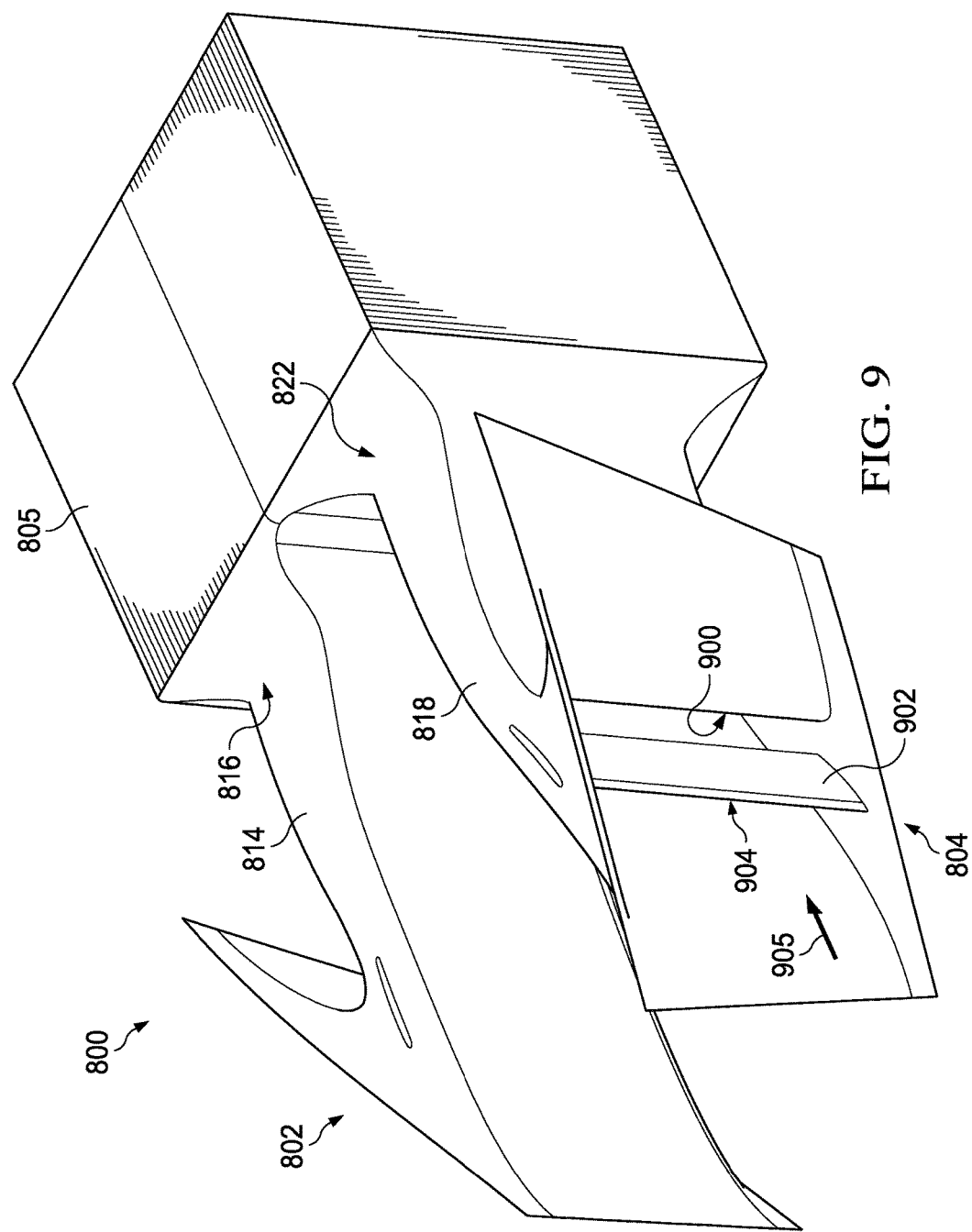
FIG. 9 is an illustration of an inlet system from the side of a second inlet in accordance with an illustrative embodiment.

With reference now to FIG. 9, an illustration of inlet system 800 from FIG. 8 from the side of second inlet 804 is depicted in accordance with an illustrative embodiment. As depicted, second inlet 804 includes leading edge 900 and vane 902. Vane 902 has leading edge 904. As depicted, fan air may flow into second inlet 804 in direction 905.

Leading edge 900 and vane 902 may be positioned such that the total pressure of the fan air along leading edge 900 of second inlet 804 and along leading edge 904 of vane 902 is equalized within selected tolerances. In particular, leading edge 900 of second inlet 804 and leading edge 904 of vane 902 may be swept such that the total pressure of the fan air along these leading edges is substantially equalized within selected tolerances.

Figure 10:
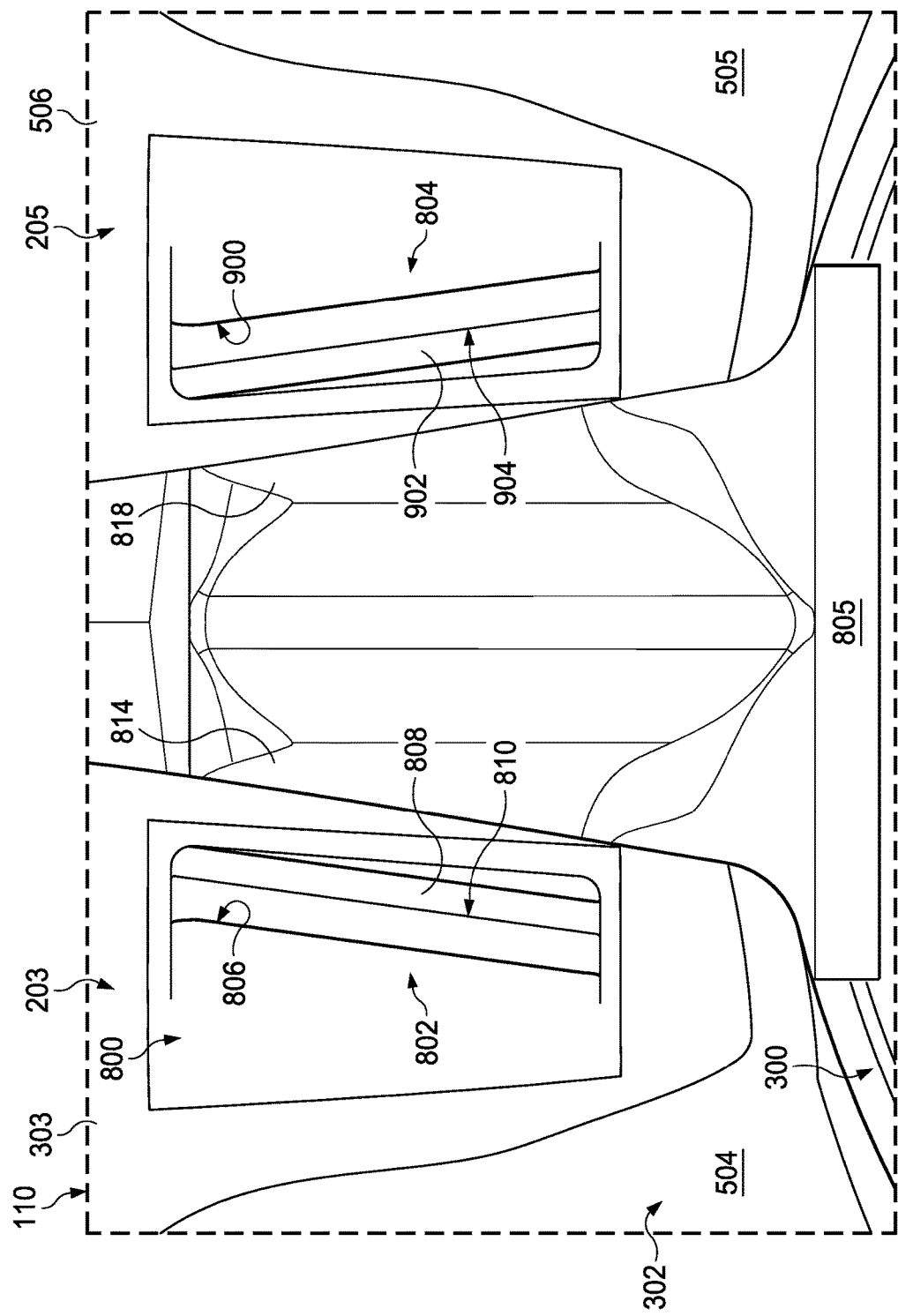
FIG. 10 is an illustration of an enlarged view of an inlet system mounted to a first surface and a third surface within an engine system in accordance with an illustrative embodiment.

With reference now to FIG. 10, an enlarged view of inlet system 800 from FIGS. 8-9 mounted to first surface 303 and third surface 506 within engine system 110 from FIG. 5 is depicted in accordance with an illustrative embodiment. In particular, inlet system 304 from FIG. 5 has been replaced with inlet system 800. As depicted, first inlet 802 is mounted substantially flush with first surface 303. Second inlet 804 is mounted substantially flush with third surface 506.

Figure 11:
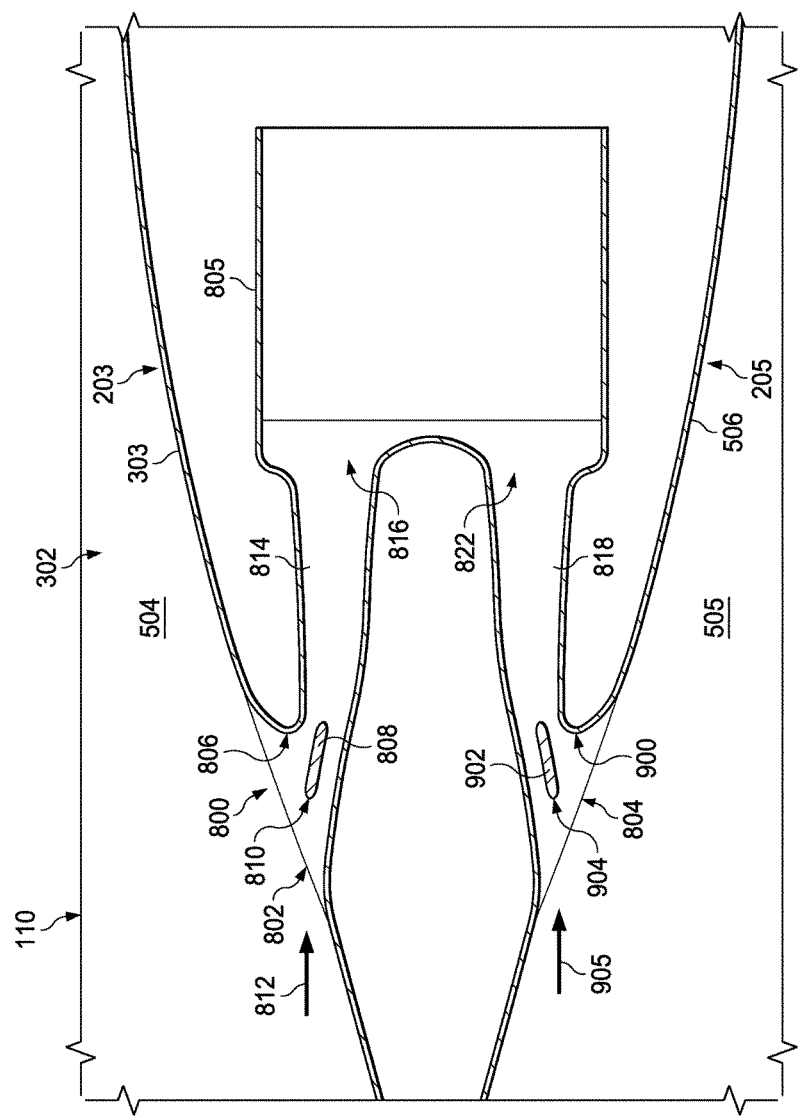
FIG. 11 is an illustration of a top view of an inlet system in accordance with an illustrative embodiment.

With reference now to FIG. 11, an illustration of a top view of inlet system 800 from FIG. 10 is depicted in accordance with an illustrative embodiment. In this illustrative example, the portion of air that flows through first inlet 802 into first duct 814 to provide air to a first half of precooler 805 is kept physically separate from the portion of air that flows through second inlet 804 into second duct 818 to provide air to a second half of precooler 805 until the air has entered precooler 805. Once the air has entered precooler 805, the air may then be combined.

Of course, in other illustrative examples, the air may be mixed prior to the air entering precooler 805. For example, the portion of air that flows through first inlet 802 into first duct 814 to provide air to a first half of precooler 805 may be mixed with the portion of air that flows through second inlet 804 into second duct 818 to provide air to a second half of precooler 805 before the air enters precooler 805.

Figure 12:
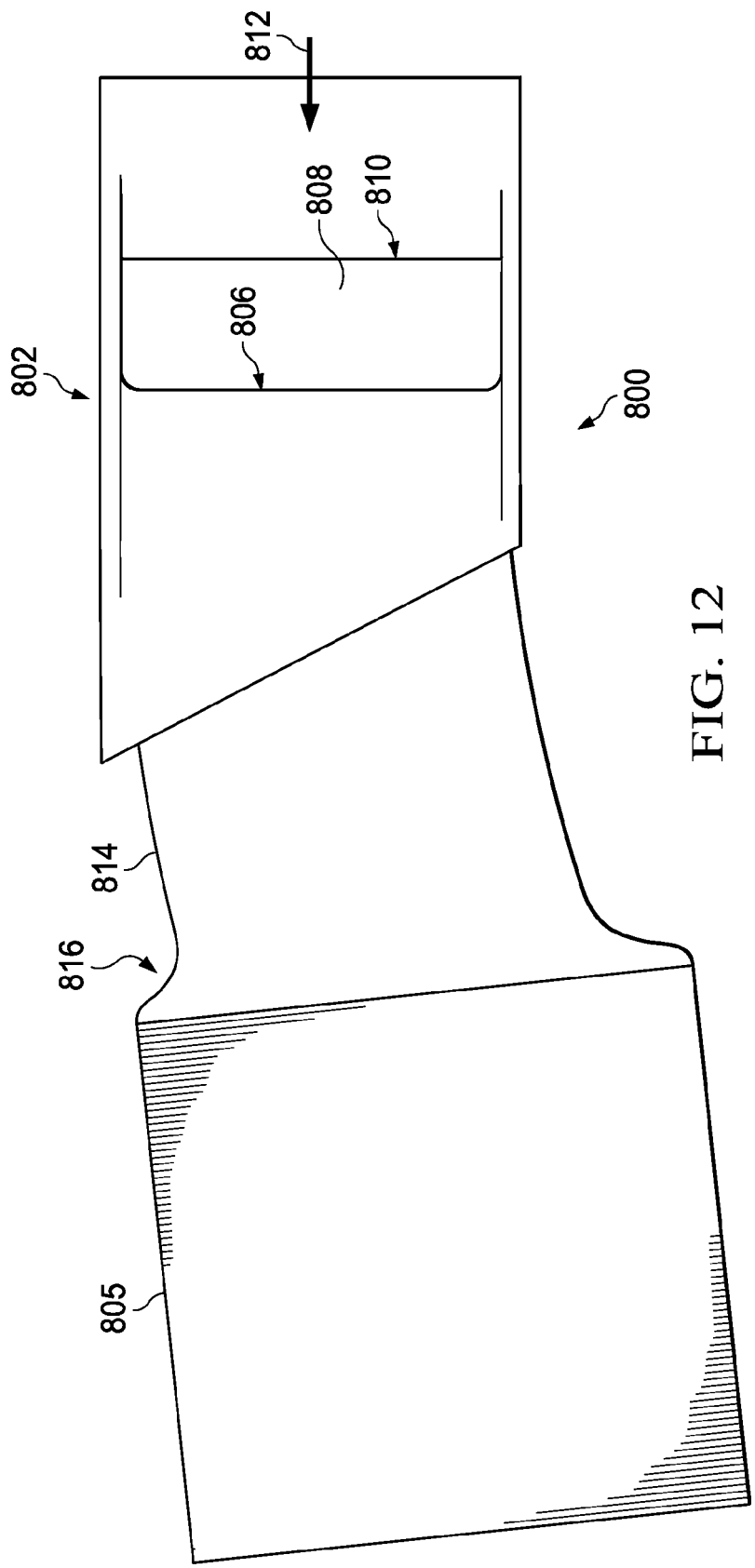
FIG. 12 is an illustration of a side view of another configuration for an inlet system in accordance with an illustrative embodiment.

With reference now to FIG. 12, an illustration of a side view of another configuration for inlet system 800 from FIG. 8 is depicted in accordance with an illustrative embodiment. In this illustrative example, a side view of inlet system 800 from the side of first inlet 802 is depicted. In this illustrative example, leading edge 806 of first inlet 802 and vane leading edge 810 of vane 808 are not swept. Rather, leading edge 806 of first inlet 802 and vane leading edge 810 of vane 808 are substantially parallel to first normal axis 414.

Figure 13:
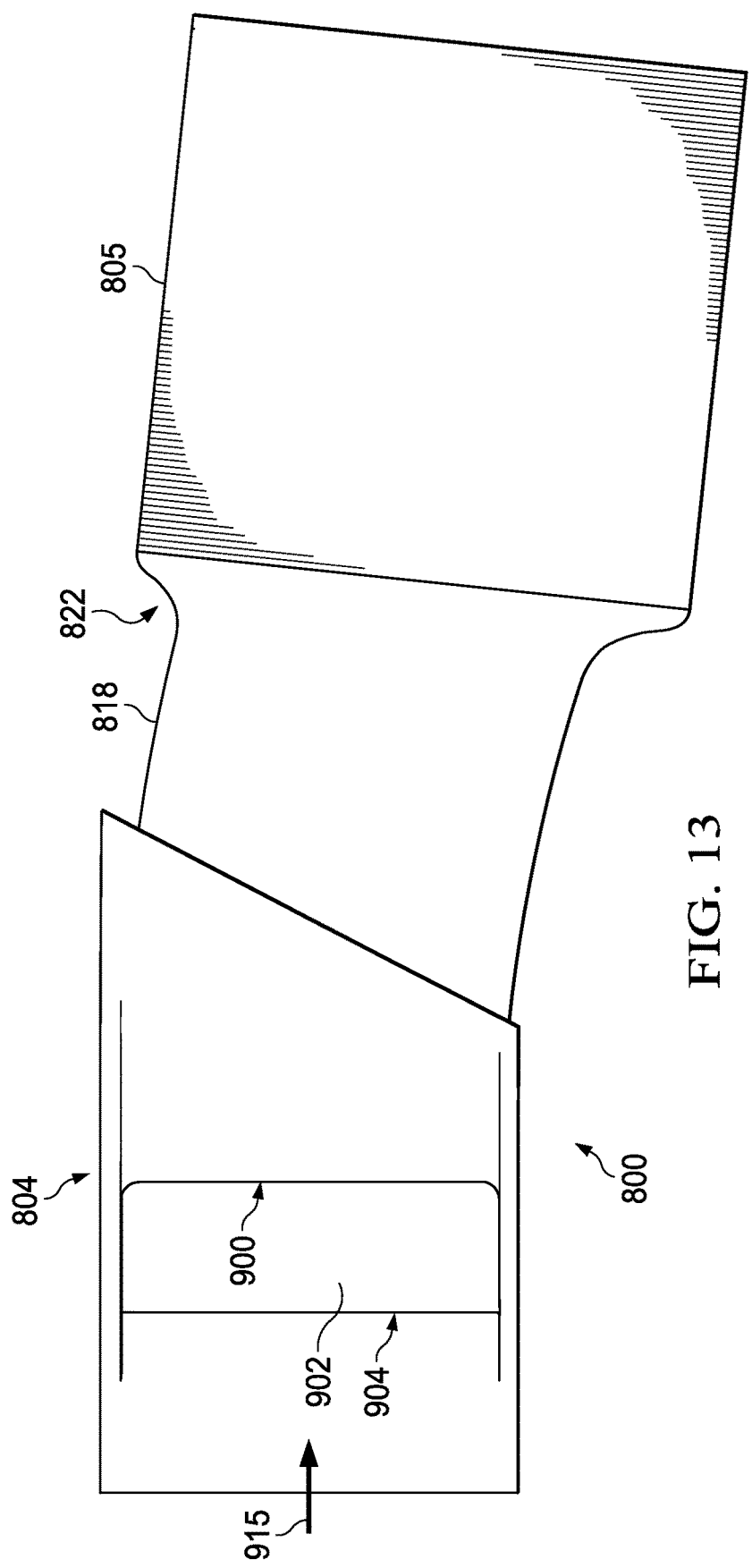
FIG. 13 is an illustration of a side view of an inlet system in accordance with an illustrative embodiment.

With reference now to FIG. 13, an illustration of a side view of inlet system 800 from FIG. 8 is depicted in accordance with an illustrative embodiment. In this illustrative example, a side view of inlet system 800 from the side of second inlet 804 is depicted. In this illustrative example, leading edge 900 of second inlet 804 and leading edge 904 of vane 902 are not swept. Rather, leading edge 900 of second inlet 804 and leading edge 904 of vane 902 are substantially parallel to first normal axis 414.

The illustrations of aircraft 100 in FIG. 1, engine system 110 in FIGS. 1-6 and 10-11, inlet system 304 in FIGS. 3-7, and inlet system 800 in FIGS. 8-13 are not meant to imply physical or architectural limitations to the manner in which an illustrative embodiment may be implemented. Other components in addition to or in place of the ones illustrated may be used. Some components may be optional.

The different components shown in FIGS. 1-13 may be illustrative examples of how components shown in block form in FIG. 14 below can be implemented as physical structures. Additionally, some of the components in FIGS. 1-13 may be combined with components in FIG. 14, used with components in FIG. 14, or a combination of the two.

Figure 14:
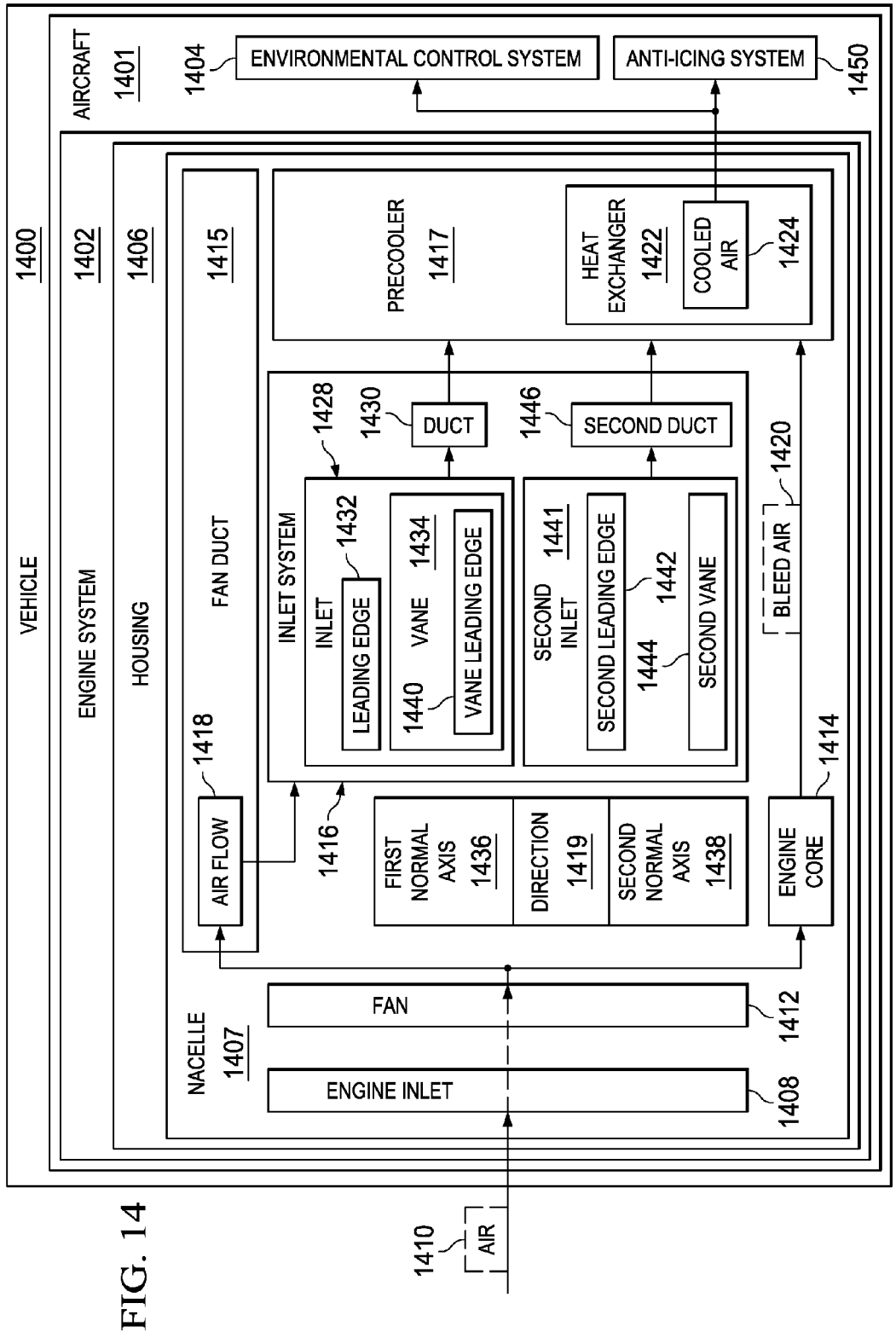
FIG. 14 is an illustration of a vehicle in the form of a block diagram in accordance with an illustrative embodiment.

With reference now to FIG. 14, an illustration of a vehicle is depicted in the form of a block diagram in accordance with an illustrative embodiment. In this illustrative example, vehicle 1400 may take the form of aircraft 1401. Aircraft 100 in FIG. 1 is an example of one implementation for aircraft 1401. In other illustrative examples, vehicle 1400 may take some other form such as, for example, without limitation, an unmanned aerial vehicle, a space vehicle, or a ground vehicle.

In this illustrative example, aircraft 1401 includes engine system 1402 and environmental control system 1404. Engine system 110 in FIG. 1 is an example of one implementation for engine system 1402. Engine system 1402 may include housing 1406 configured to house various components within engine system 1402. Housing 1406 may take the form of nacelle 1407 in this illustrative example. Nacelle 200 in FIG. 2 may be an example of one implementation for nacelle 1407.

Nacelle 1407 may form engine inlet 1408, an opening through which air 1410 may enter engine system 1402. Engine inlet 209 in FIG. 2 may be an example of one implementation for engine inlet 1408. Nacelle 1407 may house fan 1412, engine core 1414, fan duct 1415, inlet system 1416, and precooler 1417. When rotating, fan 1412 may cause air 1410 to be drawn into engine system 1402 through engine inlet 1408. Fan 1412 may create a flow of air. A portion of this air may continue to engine core 1414, while the majority portion of this air may form air flow 1418 in direction 1419 through fan duct 1415.

Bleed air 1420 from engine core 1414 may be used to supply air to environmental control system 1404. In some cases, bleed air 1420 may need to be cooled by precooler 1417 prior to being sent to environmental control system 1404.

Precooler 1417 may include heat exchanger 1422 configured to cool bleed air 1420 to form cooled air 1424 using a portion of the air from air flow 1418 through fan duct 1415. Inlet system 1416 is used to direct a portion of the air in air flow 1418 to precooler 1417.

As depicted, inlet system 1416 includes inlet 1428 and duct 1430. Inlet 306 in FIG. 3 and duct 502 in FIG. 5 may be examples of implementations for inlet 1428 and duct 1430, respectively. Duct 1430 may fluidly connect inlet 1428 to precooler 1417. In this manner, air may flow through inlet 1428, through duct 1430, and into precooler 1417.

Inlet 1428 may have leading edge 1432 and vane 1434. Leading edge 400 and vane 402 in FIG. 4 may be examples of implementations for leading edge 1432 and vane 1434, respectively. In this illustrative example, leading edge 1432 may be positioned such that the total pressure of the air along leading edge 1432 is equalized within selected tolerances. For example, leading edge 1432 may be swept in the same manner as leading edge 400 in FIGS. 4-7.

In particular, leading edge 1432 may have a first angle relative to first normal axis 1436 and a second angle relative to second normal axis 1438. First normal axis 1436 and second normal axis 1438 may each be substantially normal to direction 1419 of air flow 1418. Thus, first normal axis 1436 and second normal axis 1438 may be substantially normal to each other. The first angle of leading edge 1432 relative to first normal axis 1436 and the second angle of leading edge 1432 relative to second normal axis 1438 may be an angle that is greater than 0 degrees but less than 90 degrees. For example, the angle may be between about 5 degrees and about 80 degrees relative to second normal axis 1438. In another example, the angle may be between about 2 degrees and about 45 degrees. Depending on the implementation, the angle may be about 2 degrees, about 5 degrees, about 10 degrees, about 15 degrees, about 25 degrees, or some other angle.

Similarly, vane 1434 has vane leading edge 1440. Vane leading edge 1440 may be positioned such that the total pressure of the air along vane leading edge 1440 is equalized within selected tolerances.

For example, leading edge 1432 may be swept in the same manner as leading edge 400 in FIGS. 4-7. Vane leading edge 1440 may have a first angle relative to first normal axis 1436 and a second angle relative to second normal axis 1438. The first angle and the second angle may be, for example, between about 5 degrees and about 45 degrees. In this illustrative example, vane leading edge 1440 and leading edge 1432 may be substantially parallel to each other. In other examples, vane leading edge 1440 and leading edge 1432 may not be parallel to each other.

In this manner, leading edge 1432 and vane leading edge 1440 may be swept. Leading edge 1432 may be referred to as a swept leading edge and vane leading edge 1440 may be referred to as a swept vane leading edge. By being swept, leading edge 1432 and vane leading edge 1440 may cause total pressure of the air along these leading edges to be equalized. In this manner, when inlet system 1416 operates in a no-flow state or a low-flow state, air flow into inlet 1428 may be reduced and in some cases, prevented.

In other words, when inlet system 1416 operates in a no-flow state or a low-flow state, disruption to air flow 1418 may be reduced to within selected tolerances. All or most of the air in air flow 1418 may pass over inlet 1428 without entering inlet system 1416 and duct 1430 due to the equalization of total pressure of the air along leading edge 1432 and vane leading edge 1440. In other words, undesired spillage of air from inlet 1428 back out into fan duct 1415 may be reduced to within selected tolerances. In this manner, the performance of engine system 1402, and thereby aircraft 1401, may be improved. In particular, undesired drag, total pressure losses, static distortion, or some combination thereof, which may be created by the disruption to air flow 1418 within fan duct 1415 by this undesired spillage, may be reduced.

When vehicle 1400 takes the form of aircraft 1401, inlet system 1416 may operate in the no-flow state or low-flow state during a cruise phase of flight. Thus, inlet system 1416 may be configured to improve performance of engine system 1402 during cruise phases of flight. However, in other illustrative examples, inlet system 1416 may be designed to improve performance of engine system 1402 in one or more other phases of flight in addition to or in place of the cruise phase of flight.

In some illustrative examples, inlet 1428 may be a first inlet and duct 1430 may be a first duct. In these examples, inlet system 1416 may include second inlet 1441 and second duct 1446. In other words, inlet system 1416 may have dual inlets. Inlet system 800 in FIG. 8 may be an example of an implementation for inlet system 1416 having dual inlets. First inlet 802, second inlet 804, first duct 814, and second duct 818 in FIG. 8 may be examples of implementations for inlet 1428, second inlet 1441, duct 1430, and second duct 1446, respectively.

In one illustrative example, inlet 1428 and second inlet 1441 may be located on opposite sides of a bifurcation in nacelle 1407. For example, without limitation, inlet 1428 may be located on the side of a first section of fan duct 1415, while second inlet 1441 may be located on the side of a second section of fan duct 1415.

Second inlet 1441 may have second leading edge 1442 and second vane 1444. Second leading edge 1442 and second vane 1444 may be implemented in a manner similar to leading edge 1432 and vane 1434, respectively, of inlet 1428.

By using dual inlets, the cross-sectional area of these two inlets may be reduced. This reduction may allow duct 1430 and second duct 1446 to each have a length that is shorter than a duct used to fluidly connect a single inlet to precooler 1417. In particular, duct 1430 and second duct 1446 each have a length that allows precooler 1417 to be mounted further forward towards engine inlet 1408 of engine system 1402 as compared to when a single inlet is fluidly connected to precooler 1417 by a single duct.

Using ducts with decreased lengths may allow precooler 1417 to be positioned further forward closer to engine inlet 1408 as compared to when a longer duct is used. In this manner, when inlet system 1416 has dual inlets, precooler 1417 may be made larger as compared to when inlet system 1416 has a single inlet.

In this illustrative example, inlet 1428 and second inlet 1441 may be symmetric. Further, duct 1430 and second duct 1446 may be symmetric. Airflow into precooler 1417 may be equally supplied by each of duct 1430 and second duct 1446. However, in other illustrative examples, inlet 1428 may not be symmetric with second inlet 1441, duct 1430 may not be symmetric with second duct 1446, or both may be true.

For example, inlet 1428 and duct 1430 may be used to supply about forty percent of the airflow to precooler 1417, while second inlet 1441 and second duct 1446 may be used to supply about sixty percent of the airflow to precooler 1417. The percentage of the total airflow to precooler 1417 that is supplied by inlet 1428 and duct 1430 and by second inlet 1441 and second duct 1446 may be controlled to improve performance of engine system 1402, accommodate differences in the flow of air within the environment around and within engine system 1402, or both.

Depending on the implementation, inlet 1428 and second inlet 1441 may be different in shape, size, sweep angles, or some combination thereof. Further, one of inlet 1428 and second inlet 1441 may have a vane, while the other may not in some cases. Inlet 1428 and second inlet 1441 may each be individually designed to accommodate fan total pressure profiles on opposite sides of the bifurcation of nacelle 1407, which may be the same or different.

The illustration of vehicle 1400 and inlet system 1416 in FIG. 14 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some illustrative examples, inlet 1428 may not include vane 1434. In other illustrative examples, inlet 1428 may include vane 1434 but vane 1434 may not be swept. In still other illustrative examples, precooler 1417 may be configured to supply cooled air 1424 to anti-icing system 1450. Anti-icing system 1450 may be separate from environmental control system 1404 in these examples.

In yet other illustrative example, inlet system 1416 may include some other number of ducts. For example, inlet system 1416 may include a plurality of ducts that includes two ducts, three ducts, four ducts, or some other number of ducts.

Further, although inlet system 1416 has been described as being part of engine system 1402, inlet system 1416 may be configured in accordance with an illustrative embodiment described above for some other type of system. In particular, the configuration described for inlet 1428 may be used for any inlet mounted substantially flush with a surface. In other words, for any inlet that is mounted substantially flush with a surface, the leading edge of the inlet, the vane leading edge of a vane associated with the inlet, or both may be swept as described above to increase the performance of the system or structure within which the inlet is located during low flow or no flow conditions.

Thus, inlet 1428 and second inlet 1441 may be referred to as flush inlets. However, in other illustrative examples, a portion of inlet 1428 may be substantially flush with a surface, while another portion of inlet 1428 may not be flush with the surface. For example, a portion of inlet 1428 may extend above the surface. In this example, inlet 1428 may be referred to as a "semi-flush inlet." Inlet 1428, second inlet 1441, or both may take the form of semi-flush inlets, depending on the implementation.

Figure 15:
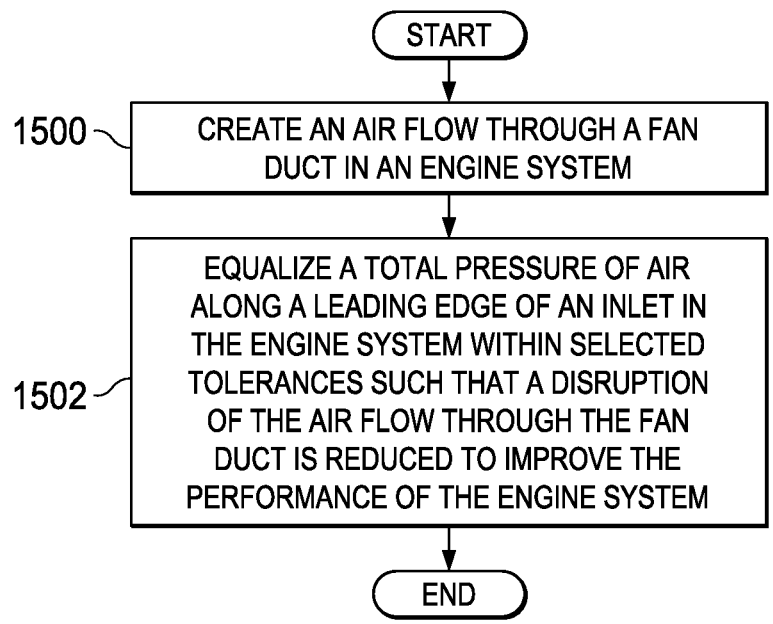
FIG. 15 is an illustration of a process for improving aerodynamic performance of an engine system in the form of a flowchart in accordance with an illustrative embodiment.

With reference now to FIG. 15, an illustration of a process for improving aerodynamic performance of an engine system is depicted in the form of a flowchart in accordance with an illustrative embodiment. The process illustrated in FIG. 15 may be implemented to improve the aerodynamic performance of an engine system such as, for example, without limitation, engine system 1402 in FIG. 14.

The process begins by creating an air flow through a fan duct in the engine system (operation 1500). Thereafter, a total pressure of air along a leading edge of an inlet in the engine system is equalized within selected tolerances such that a disruption of the air flow through the fan duct is reduced to improve the performance of the engine system (operation 1502), with the process terminating thereafter.

The air in operation 1502 may be fan air flowing from a fan of the engine system. In operation 1502, equalization of the total pressure of the air along the leading edge may be achieved by sweeping the leading edge such that the leading edge is offset from any axis that is substantially normal to the direction of the air flow through the fan duct.

Figure 16:
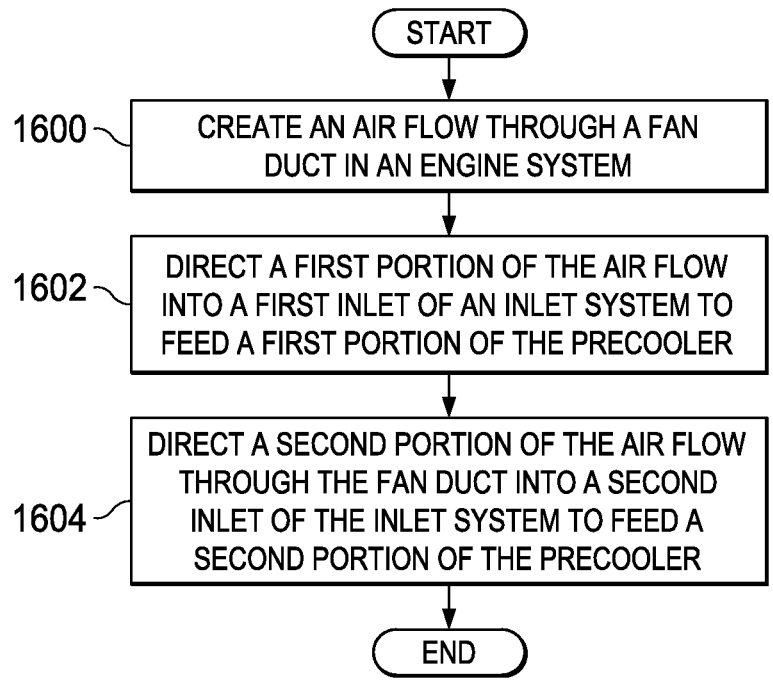
FIG. 16 is an illustration of a process for supplying air to a precooler in the form of a flowchart in accordance with an illustrative embodiment.

With reference now to FIG. 16, an illustration of a process for supplying air to a precooler is depicted in the form of a flowchart in accordance with an illustrative embodiment. The process illustrated in FIG. 16 may be implemented to supply air to a precooler, such as precooler 1417 in FIG. 14.

The process begins by creating an air flow through a fan duct in the engine system (operation 1600). A first portion of the air flow is directed into a first inlet of an inlet system to feed a first portion of the precooler (operation 1602). A second portion of the air flow through the fan duct is directed into a second inlet of the inlet system to feed a second portion of the precooler (operation 1604), with the process terminating thereafter.

By using two inlets and thereby, two ducts, to feed the precooler, a larger-sized precooler may be installed in the engine system. Further, the precooler may be mounted further forward towards an engine inlet of the engine system.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, or some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. As one illustrative example, operation 1602 and operation 1604 in FIG. 16 may be performed simultaneously.

Thus, the illustrative embodiments describe an inlet system that does not disrupt the flow of air through the fan duct of an engine more than desired. The inlet system may be implemented in a manner similar to inlet system 304 in FIG. 3, inlet system 800 in FIG. 8, or inlet system 1416 in FIG. 14. An inlet system configured in a manner similar to any of these inlet systems may improve the overall performance of the engine system within which the inlet system is located. Further, with this type of inlet system, a precooler may be mounted further forward than is currently possible using current configurations for inlets. Still further, larger precoolers may be used.

The configuration of inlet system 304 in FIG. 3, inlet system 800 in FIG. 8, or inlet system 1416 in FIG. 14 may be used with other types of systems other than engine systems. For example, the configuration of inlet 1428 described in FIG. 14 may be used for a flush inlet in any system, structure, or platform where equalization of a total pressure along at least one leading edge of the flush inlet within selected tolerances is desired.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a member located radially between an engine core and a nacelle, the nacelle surrounding the engine core;
an inlet system located on an outer surface of the member in a fan duct that guides a flow of air from a fan in an engine;
the inlet system further comprising:
a first inlet located on a sidewall of the member, such that the first inlet comprises a first leading edge and a first sweep,
wherein the first leading edge comprises a number of portions, configured such that a first portion of the number of portions of the first leading edge, nearest to a center axis of the fan, lies further upstream in the flow of air from the fan than a second portion of the number of portions of the first leading edge, furthest from the center axis of the fan;
a second inlet;
a first duct configured to fluidly connect the first inlet to a precooler; and
a second duct configured to fluidly connect the second inlet to the precooler.

2. The inlet system of claim 1, further comprising the first inlet configured such that a total pressure at each portion, in the number of portions of the first leading edge, remains substantially equal to a total pressure at each other portion of the first leading edge.

3. The inlet system of claim 2, further comprising the first duct configured to physically separate air in the first duct from air in the second duct until rejoined in the precooler.

4. The inlet system of claim 2, further comprising the first duct configured to mix air in the first duct with air in the second duct before the precooler.

5. The inlet system of claim 1, wherein the first inlet comprises:
the first leading edge; and
a first vane that comprises a first vane leading edge parallel to the first leading edge of the first inlet, wherein the first vane leading edge lies further upstream relative to the first leading edge with respect to the flow of air from the fan.

6. The inlet system of claim 5, further comprising the first leading edge configured such that an equalized total pressure along the first leading edge precludes a back flow from inlet that disrupts the flow of air from the fan.

7. The inlet system of claim 5, further comprising the first vane leading edge comprising a number of first vane portions and a first vane sweep configured to equalize a total pressure at each portion in the number of portions of the first vane leading edge.

8. The inlet system of claim 5, wherein the second inlet comprises:
a second leading edge; and
a second vane that comprises a second vane leading edge.

9. The inlet system of claim 8, wherein the second leading edge comprises a number of portions of the second leading edge and a second sweep configured such that:
a total pressure at each portion, in the number of portions of the second leading edge, remains substantially equal to a total pressure at each other, in the number of portions of the second leading edge; and
a portion, nearest to the center axis of the fan, of the second leading edge lies further upstream, in the flow of air from the fan, than a second portion, furthest from the center axis of the fan, in the number of portions of the second leading edge.

10. The inlet system of claim 8, further comprising the second vane leading edge comprising a number of second vane portions and a second vane sweep configured to equalize a total pressure at each portion in the number of portions of the second vane leading edge.

11. The inlet system of claim 1, wherein the first inlet is configured to be mounted substantially flush with a first bifurcation surface of an engine system and wherein the second inlet is configured to be mounted substantially flush with a second bifurcation surface of the engine system.

12. The inlet system of claim 1, wherein the first duct and the second duct each comprise a length configured such that a position of the precooler lies closer to an engine inlet of an engine system than a functional precooler for a single duct inlet system in the same engine system.

13. The inlet system of claim 1, further comprising:
the first sweep of the first leading edge being substantially equal to a first vane sweep of a first vane in the first inlet; and
a second sweep of a second leading edge being substantially equal to a second vane sweep of a second vane in the second inlet.

14. The inlet system of claim 1, further comprising the first sweep comprising an angle of approximately 15 degrees relative to a plane normal to a direction of the flow of air from the fan.

15. A turbofan engine comprising:
a member located radially between an engine core and a nacelle, the nacelle surrounding the engine core;
wherein an inlet system is located on an outer surface of the member in a fan duct that guides a flow of air from a fan in the turbofan engine system;
wherein the fan is configured to generate the flow of air by a first inlet located on a sidewall of the member, and a second inlet, such that the first inlet comprises a first leading edge and a first sweep,
wherein the first leading edge comprises a number of portions, configured such that a first portion of the number of portions of the first leading edge, lies nearest a center axis of the fan and further upstream in the flow of air, than a second portion of the first leading edge, located further from the center axis of the fan;
responsive to a low-flow state of the flow of air, from the fan, through the first inlet, a total pressure at the first portion of the number of portions of the first leading edge substantially equals a total pressure at each portion in the number of portions of the first leading edge; the inlet system further comprising:
a precooler;
a first duct configured to fluidly connect the first inlet to the precooler; and
a second duct configured to fluidly connect the second inlet to the precooler; and
wherein the second inlet comprises a second leading edge that comprises a second sweep.

16. The turbofan engine system of claim 15, further comprising:
the first inlet configured such that, responsive to a low-flow state of the flow of air, from the fan, through the first inlet, a total pressure at the first portion substantially equals a total pressure at each portion in the number of portions of the first leading edge; and wherein the first inlet and the second inlet each comprise, respectively, a vane that comprises a vane leading edge that comprises a vane leading edge sweep that comprises a first portion of the vane leading edge located further upstream relative to the flow of air through the first inlet than a second portion of the vane leading edge located further from the center axis of the fan than the first portion of the vane leading edge.

17. The turbofan engine system of claim 16 further comprising:
a fan duct, wherein the respective leading edges and the vanes of the first and second inlet are each configured to reduce undesired spillage from the first inlet and the second inlet back out into the fan duct to within selected tolerances.

18. A method for reducing spillage from an inlet system supplying air to a precooler, the method comprising:
creating an air flow from a fan through a fan duct in an engine system, the engine system comprising the inlet system, a member located radially between an engine core and a nacelle, the nacelle surrounding the engine core;
wherein the inlet system is located on an outer surface of the member in a fan duct that guides a flow of air from a fan in an engine;
the method further comprising:
directing a first portion of the air flow into a first inlet located on a sidewall of the member and feeding a first half of the precooler, the first inlet comprising a first leading edge and a first sweep,
wherein the first leading edge comprises a number of portions, configured such that a first portion of the number of portions of the first leading edge, nearest to a center axis of the fan, lying further upstream in the air flow than a second portion of the number of portions of the first leading edge, furthest from the center axis of the fan; and
directing a second portion of the air flow through the fan duct into a second inlet of the inlet system to feed a second half of the precooler, the second inlet comprising a second leading edge comprising a number of portions and a second sweep comprising:
responsive to air flowing into the second inlet, a total pressure at each portion, in the number of portions of the second leading edge, remaining substantially equal to a total pressure at each other portion of the second leading edge; and
a first portion of the number of portions of the second leading edge, nearest to a center axis of the fan, lying further upstream in the air flow than a second portion of the number of portions of the second leading edge, furthest from the center axis of the fan.

19. The method of claim 18, wherein directing the first portion of the air flow into the first inlet to feed the first half of the precooler comprises directing the first portion of the air flow into the first inlet of the inlet system to feed the first half of the precooler responsive to the inlet system being in a high flow state, such that, responsive to air flowing into the first inlet, a total pressure at each portion, in the number of portions of the first leading edge, remaining substantially equal to a total pressure at each other portion of the first leading edge.

20. The method of claim 18, wherein directing the second portion of the air flow into the second inlet to feed the second half of the precooler comprises:
directing the second portion of the air flow into the second inlet of the inlet system to feed the second half of the precooler responsive to the inlet system being in a high-flow state.

* * * * *